(No Model.)

W. H. BINNS.
HUB AND SHAFT COUPLING FOR BICYCLES.

No. 473,818. Patented Apr. 26, 1892.

ATTEST:
Geo. H. Arthur
J. A. Young

INVENTOR:
William H. Binns,
by Roberts Burns
Attorney.

UNITED STATES PATENT OFFICE.

WILLIAM H. BINNS, OF CHICAGO, ILLINOIS, ASSIGNOR TO THE CHICAGO SEWING MACHINE COMPANY, OF SAME PLACE.

HUB AND SHAFT COUPLING FOR BICYCLES.

SPECIFICATION forming part of Letters Patent No. 473,818, dated April 26, 1892.

Application filed December 9, 1891. Serial No. 414,500. (No model.)

*To all whom it may concern:*

Be it known that I, WILLIAM H. BINNS, a citizen of the United States, residing at Chicago, in the county of Cook and State of Illinois, have invented a certain new and useful Improvement in Hub and Shaft Couplings for Bicycles; and I do hereby declare the following to be a full, clear, and exact description of the same, reference being had to the accompanying drawings, forming part of this specification.

This invention relates more especially to the attachment or coupling between the chain or sprocket wheel and its shaft, but is capable of use in other situations where a coupling between a wheel or other hub and its carrying-shaft is required, the object of the present improvement being to provide an improved connection between the two parts embodying the features of a solid and substantial connection which is capable of ready attachment or detachment as required. I attain such object by the construction and arrangement of parts illustrated in the accompanying drawings, in which—

Figure 1:
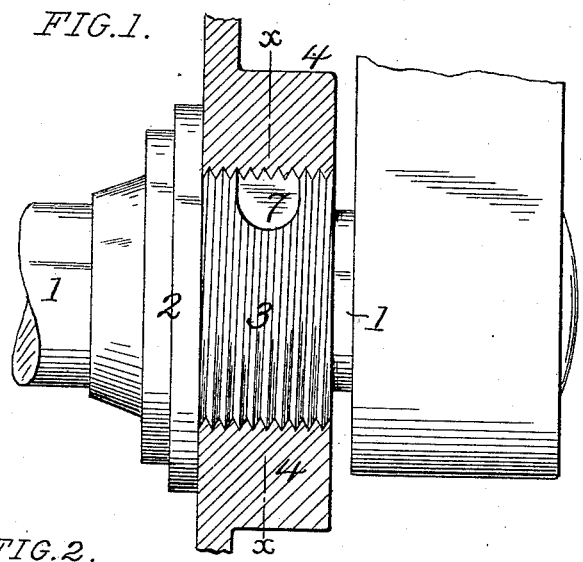
Figure 2:
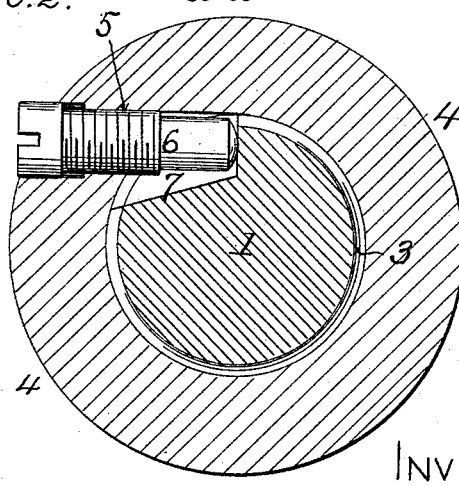

Figure 1 is an elevation, partly in section, of a portion of the pedal-shaft and pedal-arm of a Safety bicycle, illustrating my present invention; and Fig. 2, a cross-section of the same at line *x x*, Fig. 1.

Similar numerals of reference indicate like parts in both views.

Referring to the drawings, 1 represents a portion of the pedal or other shaft having a collar, stop, or enlargement 2 and an adjacent screw-threaded portion 3, on which the internally-screw-threaded bore of the hub 4 is adapted to screw to an abutment against the adjacent face of the collar or stop 2. In the present improvement the hub 4 is provided with a tangential screw-threaded orifice 5 for the reception of the tangential set-screw 6, the inner end of which in effecting a coupling will have its abutment against a radial face in the shaft 1, formed by a recess 7 in the periphery of the same, as shown in Figs. 1 and 2. The tangential screw will pass in from the left, as shown in Fig. 2, when the screw-thread 3 on the shaft is of a left-handed formation, and similarly will pass in from the right when the screw-thread is of a right-handed formation.

Having thus fully described my said invention, what I claim as new, and desire to secure by Letters Patent, is—

In a coupling for the pedal-shaft of bicycles and like uses, the combination of the shaft 1, provided with a collar or stop 2, a screw-threaded portion 3, and a peripheral recess 7, with the hub 4, having a screw-threaded bore and the tangent set-screw 6, substantially as set forth.

In testimony whereof witness my hand this 7th day of December, 1891.

WILLIAM H. BINNS.

In presence of—
J. W. KISER,
ROBERT BURNS.